United States Patent [19]
McInerny

[11] 3,949,981
[45] Apr. 13, 1976

[54] MECHANISM FOR STACKING SHEETS
[75] Inventor: George P. McInerny, Andalusia, Pa.
[73] Assignee: Brandt-Pra, Inc., Cornwells Heights, Pa.
[22] Filed: Sept. 16, 1974
[21] Appl. No.: 505,987

Related U.S. Application Data
[62] Division of Ser. No. 344,999, March 26, 1973, Pat. No. 3,857,559, which is a division of Ser. No. 227,847, Feb. 22, 1972, Pat. No. 3,771,783.

[52] U.S. Cl. ................. 271/178; 271/214; 271/219
[51] Int. Cl.² .................... B65H 29/22; B65H 31/14
[58] Field of Search .......... 271/177, 178, 179, 180, 271/181, 214, 219

[56] References Cited
UNITED STATES PATENTS

| | | | |
|---|---|---|---|
| 141,491 | 8/1873 | Clark | 271/214 |
| 2,844,373 | 7/1958 | Van Marle | 271/178 |
| 3,162,438 | 12/1964 | Perry | 271/214 X |
| 3,420,149 | 1/1969 | Middleditch et al. | 271/214 X |

Primary Examiner—John J. Love
Assistant Examiner—Bruce H. Stoner, Jr.
Attorney, Agent, or Firm—Ostrolenk, Faber, Gerb & Soffen

[57] ABSTRACT

A sheet stacking mechanism neatly stacks a plurality of sheets, which may be of dissimilar sizes, thicknesses and surface quality (finishes), in the original sequence in which the sheets are fed into the mechanism. An outfeed mechanism picks each sheet into the stacker and removes each sheet entering into the stacker away from the throat of the stacker to permit unimpeded entry of the next sheet to the stacker. Anti-skewing devices are employed at various locations to maintain the sheets in proper alignment during stacking. Linkage means having a mechanical advantage greater than one interconnects a biasing spring to a stacker bar to provide elongation of the spring inversely proportional to the distance moved by the bar in response to the accumulation of stacked sheets thereon to render more uniform the force exerted on the bar by the spring means to provide uniform stacking.

3 Claims, 3 Drawing Figures

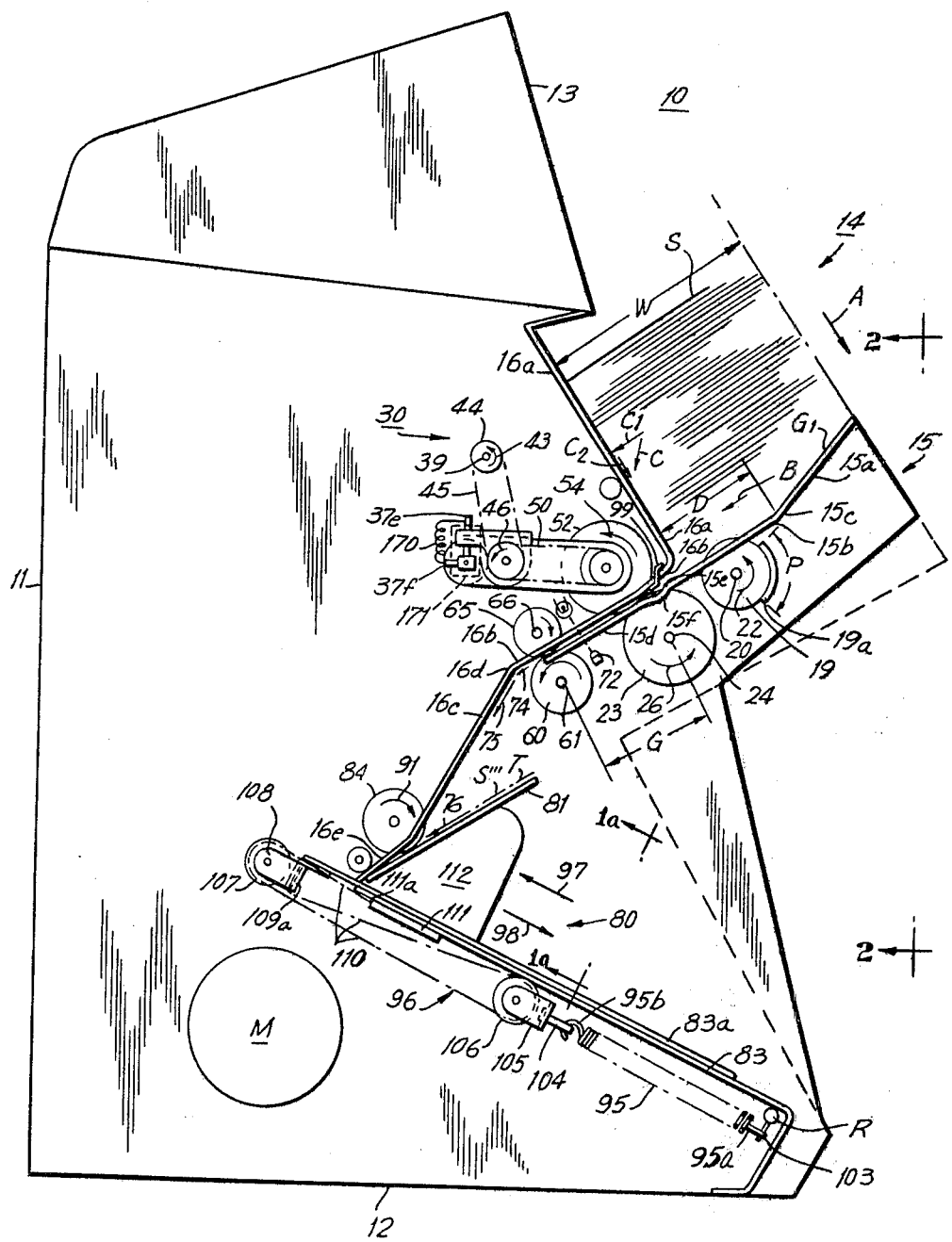

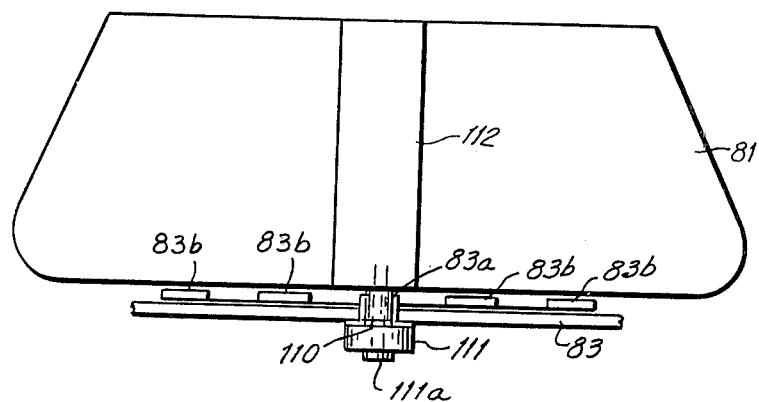

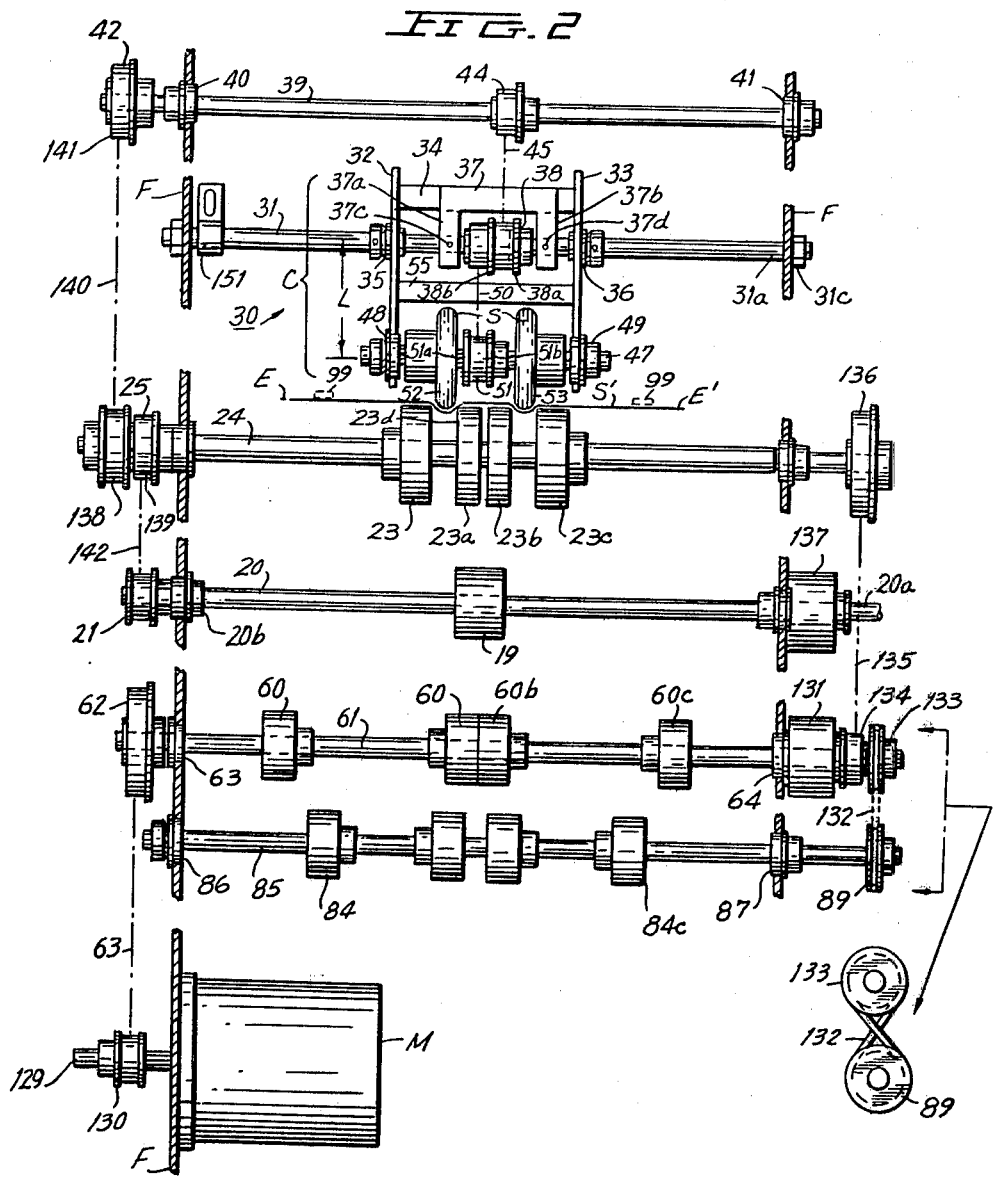

MECHANISM FOR STACKING SHEETS

This is a division of application Ser. No. 344,999, filed Mar. 26, 1973, now U.S. Pat. No. 3,857,559, which, in turn, is a division of application Ser. No. 227,847, filed Feb. 22, 1972, now U.S. Pat. No. 3,771,783 issued Nov. 13, 1973.

The present invention relates to sheet, stacking means and more particularly, to a novel high-speed sheet stacking means capable of uniformly stacking sheets of varying thicknesses, dimensions and quality in the original sequence in which the sheets are fed into the stacking means.

BACKGROUND OF THE INVENTION

There are a wide variety of applications in which document stackers are either required or are advantageous for use. For example, in banks or other like institutions, it is very advantageous to provide apparatus for accurately stacking large quantities of bills (i.e. paper currency) and also a tremendous volume of checks which are of varying sizes, thicknesses, finishes and the like. As a result, stacks of checks of the same dimensions and thicknesses must be formed before such checks can be counted, thereby greatly increasing the amount of handling operations necessary in the processing of such documents.

Another typical application in which such stacking devices are employed is in the field of coupons. Coupons may take a variety of forms such as those which are printed in newspapers and/or periodicals and which are normally cut out from such newspapers and periodicals prior to use. Coupons may also be provided as part of the package in which a product is wrapped and hence be of still another form of paper insofar as size, weight and/or thickness of paper and finish are concerned. Companies processing such coupons would find it highly advantageous to be able to process coupons of varying sizes, thicknesses and finishes while at the same time being capable of counting stacks of such dissimilar coupons accurately and at a high rate of speed. It should be understood that the applications set forth hereinabove are merely exemplary and that a large variety of other applications in which devices capable of stacking documents of dissimilar sizes, weights, thicknesses and finishes can be used to great advantage.

BRIEF DESCRIPTION OF THE INVENTION

The present invention is characterized by providing a sheet stacking device which is simple in design and yet which is capable of stacking sheets of different thicknesses, weight, dimensions and finishes at speeds not heretofore obtainable through conventional apparatus. The present invention comprises deflecting means positioned in the movement path of a plurality of sheets moving in tandem fashion in a first direction towards the stacker means with the deflecting means deflecting each sheet away from the first direction and towards the stacking means and simultaneously realigning any sheet moving towards the deflecting means in a skewed fashion. The stacking means includes a guide plate and a bar respectively engaging the leading edge and the surface of each sheet delivered to the stacking means, with the surface of the bar being inclined at an angle of less than 90° relative to the surface of the guiding plate. The end of the deflecting means closest to the bar is inclined at another angle of less than 90° relative to both the surface of the bar and the guiding plate to abruptly move the trailing edge of the last sheet fed thereto out of the path of the leading edge of the next sheet to be fed thereto and before the next sheet enters into the stacker region, thereby forming a substantially neat and compact stack of sheets within the stacker in original sequence.

A kicker means is provided having a portion of a continuous roller surface partially protruding through an opening in the deflecting means for redeflecting the leading edge of each sheet towards the first direction and for urging the leading edge against the guiding plate.

Linkage means having a mechanical advantage greater than one interconnects a biasing spring to the bar to render the force exerted on the bar by the spring means more uniform as the spring means is elongated a distance inversely proportional to the distance moved by the bar in response to the accumulation of stacked sheets thereon.

OBJECT OF THE INVENTION

It is one object of the present invention to provide a stacker for receiving and stacking sheets in an orderly manner and in original sequence even though said sheets are advanced toward the stacker in a high speed and skewed manner.

BRIEF DESCRIPTION OF THE FIGURES

The above as well as other objects of the present invention will become apparent when reading the accompanying description and drawings in which:

FIG. 1 is an elevational view of a feeding, separating and stacking apparatus designed in accordance with the principles of the present invention.

FIG. 1a is a sectional view showing a portion of the stacker of FIG. 1 looking in the direction of arrows 1a—1a.

FIG. 2 is an elevational view of a portion of arrows 2—2 wherein only those portions which are felt to be important to clarify an understanding of the operation of the mechanism have been illustrated.

DETAILED DESCRIPTION OF THE FIGURES

FIGS. 1 and 2 show a device 10 designed in accordance with the principles of the present invention, which device 10 is comprised of a housing 11 having a base portion 12 for supporting device 10 upon any suitable surface such as, for example, a table or counter. The relatively small size and light weight of the device greatly enhances its portability and facilitates handling of the device to enable its use in practically any desired location.

The housing 11 is provided with a front face 13 at its upper end which may be fitted or otherwise provided with control panels incorporating controls (not shown for purposes of simplicity) for turning the machine on and off, providing a visually observable count of the number of documents handled by the device and so forth, with the number and type of display mechanism and controls being dependent merely upon the needs of the particular application.

The face 13 forms a portion of the front of housing 11 which is further provided with an infeed hopper 14 which consists of a stack supporting member 15 and a forward edge supporting member 16. A stack of sheets to be fed and separated is positioned within infeed hopper 14 in the manner shown best in FIG. 1 with the weight of the stack substantially resting upon the upper exposed surface of plate 16. The inclination of the hopper 14 and specifically base plate 15 and supporting plate 16, as shown best in FIG. 1, is such that the weight of the sheets within the stack serve to cause the stack to remain within the hopper without providing any top weight upon the stack. The right-hand-most portion 15a of the hopper supporting plate 15 is inclined at an angle greater than that of the adjacent surface portion 15b to which it is integrally joined. The inclined orientation of the entire infeed hopper is such as to cause the forward or leading edges of at least some of the sheets in stack S to rest against plate 16.

The infeed hopper supporting surfaces 15a and 15b are integrally joined at a "knee" portion 15c which is located a predetermined distance D from portion 16a of infeed hopper plate 16. This distance is preferably selected so as to be substantially less than the width W of the narrowest document which the infeed hopper is designed to process. As the sheets of the stack are fed in the direction of arrow A, a small group of the bottom-most sheets are displaced or otherwise moved in the direction shown by arrow A so that their trailing edges are moved downwardly along inclined portion 15a of the infeed hopper supporting plate 15. The remainder of the stack S, however, has its rearward portion resting upon the right-hand end of inclined portion 15a (relative to FIG. 1). This arrangement removes the weight of or on the rearward end of stack S from the group of sheets (usually 1–5 in number) removed from beneath the right-hand end of the stack, thereby greatly facilitating the feeding and separating operations as will be more fully described.

A picker wheel 19 is mounted upon a shaft 20 and the portion 15b of supporting plate 15 is provided with an opening (not shown) to enable the upper portion of the picker wheel 19 to protrude therethrough. The angle of inclination of surface 16a of the infeed hopper which engages the leading edges of most of the sheets is such as to carry some of the weight of the sheets and thereby release this weight from the bottom-most group of sheets to greatly facilitate the feeding of the sheets from the infeed hopper to the next processing location. The weight of the sheets may be represented as a force vector C whose direction is vertically downward. This force may be represented as the force components $C_1$ and $C_2$ which are, respectively, perpendicular and parallel to surface 16a. Surface 16a acts to support the force component $C_1$ and thereby release this force component from the weight of the bottom-most sheets. Additionally, there is some frictional force between the leading edges of the sheets and the engaging surface 16a to reduce the effect of the force component $C_2$ upon the bottom-most sheets. This frictional force may be enhanced or increased by treating or otherwise forming the sheet engaging surface of portion 16a to provide a roughened finish.

Picker wheel 19 is provided with an insert 19a along a portion of its periphery which is formed of a material having a substantially high coefficient of friction and which is raised a finite distance above the remaining periphery of wheel 19.

The tangential velocity of the picker wheel is preferably less than that of the drive wheel so as not to feed documents faster than they can be handled by the drive wheel.

The bottom-most sheet in the stack is thus urged toward a plurality of drive wheels 23 which are all mounted upon a common shaft 24 journalled within the machine frame F near its right and left-hand ends. At least one end of shaft 24 is provided with a pulley 25 for receiving a belt (not shown for purposes of simplicity) which is entrained about a suitable drive wheel and pulley 25 to rotate shaft 24 and hence rollers 23 in the direction shown by arrow 26. Portion 15e of infeed hopper support plate 15 is integrally joined to portion 15b of plate 15 in the region of a double bend or "kink" provided within support plate 15. As can best be seen in FIG. 1, the forward-most end of support plate portion 15b bends downwardly at 15e and upwardly at 15f so that plate portion 15d lies a slight distance below plate portion 15b. Plate portion 15d is further provided with a plurality of apertures (not shown for purposes of simplicity) to enable a portion of the periphery of rollers 23 to protrude therethrough in the manner shown best in FIG. 1. The centrally located rollers 23a and 23b are positioned in closely spaced fashion while the spacing between rollers 23 and 23a and 23b and 23c is substantially greater than the spacing between rollers 23a and 23b. This arrangement is to accommodate the stripper wheel assembly to be described in more detail hereinbelow.

The kink or double bend provided in the immediate region wherein the peripheries of rollers 23–23c protrude through plate portion 15d serves to facilitate the frictional engagement between the bottom-most sheet fed toward drive wheels 23 by picker wheel 19 due to the fact that the leading edge of the bottom-most sheet is enabled to "droop" downwardly over the kink in the support sheet and thereby assure better frictional engagement of the sheet with the peripheries of rollers 23–23c.

A stripper assembly 30 is positioned substantially above the drive wheel assembly comprised of drive wheels 23–23c. Assembly 30 consists of a shaft 31 having one end 31a mounted within an elongated opening in machine Frame F. A nut 31c engages the threaded end of shaft 31. The elongated opening in the machine frame receiving shaft end 31a allows for adjustment of the stripper wheel assembly to assure parallelism with the drive wheel assembly. The opposite end 31b of shaft 31 fits within an opening in the machine frame and is secured thereto by a nut 31d.

A pair of stripper wheel supporting plates 32 and 33 are secured to one another by means of a cross-arm 34 (shown best in FIG. 2) and are each provided with openings for receiving bearings 35 and 36 which free wheelingly mount arms 32 and 33 to shaft 31. Assembly 30 further includes a substantially U-shaped member 37 whose arms 37a and 37b are provided with openings for receiving shaft 31. Set screws 37c and 37d provided in arms 37a and 37b lock member 37 to shaft 31 causing member 37 to assume the same angular orientation as shaft 31. A pulley member 38 is embraced by arms 37a and 37b and is arranged to rotate in a free wheeling manner upon shaft 31. Pulley 38 is provided with a pair of continuous annular-shaped rims 38a and 38b. A cylindrical bushing (not shown) is preferably mounted between pulley 38 and shaft 31 to enhance the free wheeling movement of the pulley.

Positioned above pulley member 38 and shaft 31 is a shaft 39 having bearings 40 and 41 near its free ends to mount shaft 39 to machine frame F in a free wheeling manner. Shaft 39 is provided with a pulley 42 adapted to receive a belt 140 (shown schematically as a dotted line for purposes of simplicity) which is entrained about a drive pulley 138 (also shown schematically as a dotted line for purposes of simplicity) and pulley 42 so as to rotate shaft 39 in a direction shown by arrow 43 (see FIG. 1). Shaft 39 is provided with a pulley 44 rigidly secured to shaft 39 and located at a point substantially intermediate the ends thereof. A belt 45 is entrained about pulley 44 and pulley 38 (in the region between rings 38a and 38b) so as to impart rotation of shaft 39 and hence pulley 44 to pulley 38. For purposes of simplicity, belt 45 has been represented as a dotted line extending between pulleys 38 and 44 in FIG. 2. This arrangement causes pulley 38 to rotate in the direction shown by arrow 46 (see FIG. 1).

Stripper assembly 30 is further comprised of a shaft 47 mounted to the forward free ends of arms 32 and 33 by means of bearings 48 and 49 which mount shaft 47 in a free-wheeling manner relative to arms 32 and 33. A belt 50 (see FIG. 1) is entrained about the left-hand portion of pulley 38 and a pulley 51 secured to free-wheeling shaft 47. Belt 50 is shown in dotted line fashion in FIG. 2 for purposes of simplicity. Belt 50 is fitted between rims 51a and 51b provided on pulley 51. Free-wheeling shaft 47 is further provided with a pair of stripper rollers 52 and 53 rigidly secured to shaft 47 and arranged so that the peripheries of wheels 52 and 53 extend slightly below the peripheries of drive wheels 23–23c, as shown in both FIGS. 1 and 2. Thus rotation of shaft 39 and pulley 44 is ultimately imparted to stripper wheels 52 and 53 which rotate in the direction shown by arrow 54 (see FIG. 1). The wheels 52 and 53 are laterally adjustable along shaft 47 as are the drive wheels 23–23c along their shaft 24, to adjust the assemblies for accommodating sheets of different thicknesses and stiffness as well as providing for periodic adjustment due to the normal wearing of the wheels.

The stripper wheels 52–53 cause the sheet engaging their peripheries to be fed rearwardly thereby urging the sheet back toward the stack. Since the major portion of the weight of the stacked sheets is removed from the substantially "weight free pocket " formed within the bottom-most region of the infeed hopper 14, the reverse movement of the sheet fed rearwardly toward the infeed hopper permits the trailing edge of the sheet to move rearwardly without experiencing any curling over or bending.

The acceleration wheels are shown best in FIG. 2 and are comprised of individual wheels 60–60c, all mounted upon a common shaft 61 and being locked thereto so as to rotate with the rotation of shaft 61. The shaft is journalled to machine frame F by bearings 63 and 64 so as to be mounted in a free-wheeling manner relative to the machine frame. The left-hand end of shaft 61 is provided with a pulley 62 which cooperates with a belt 63 (shown in phantom line fashion in FIG. 2 for purposes of simplicity) for imparting the rotational drive required for the acceleration wheels.

The acceleration wheels cooperate with a plurality of idler rollers 65 (only one of which is shown in FIG. 1 for purposes of simplicity). The peripheries of the outer idler rollers have a lower coefficient of friction than the idler rollers associated with acceleration wheels 60a and 60b. It should be understood that there is one idler roller arranged in alignment with each of the acceleration wheels 60–60c which idler rollers are preferably independently mounted.

The rollers 60a and 60b are tightly aligned near the center of shaft 61, while rollers 60 and 60c are positioned a large distance away from rollers 60a and 60b. The peripheries of rollers 60a and 60b have a higher coefficient of friction than rollers 60 and 60c. Due to the tight alignment of rollers 60a and 60b at the center of shaft 61 these rollers do not promote skewing of a sheet engaging the rollers 60a and 60b. In order to prevent the outer rollers 60 and 60c from promoting skewing, the idler rollers cooperating with acceleration wheels 60 and 60c are positioned slightly downstream of the idler rollers cooperating with acceleration wheels 60a and 60b.

In cases where a sheet is skewed as it advances toward the acceleration wheels, the alignment of the idler roller's cooperation with acceleration wheels 60 and 60c is such as to cause the leading edge LE advanced thereto, to strike the surface of idler 60 (for example) a spaced distance away from the point where it engages the periphery of wheel 60. This causes either realignment or a significant reduction in the skewing of the document. The leading edge will then be directed toward this point of engagement to be accelerated by wheel 60 and idler 65.

In cases where some skewing exists even after the document has entered between wheels 60a–60b and the associated idlers, the outer wheels 60 and 60c and their associated idlers assure the fact that the end portion of the trailing edge which is the last to leave the influence of the acceleration wheels will nevertheless be advanced to the stacker.

The infeed hopper plate 16 is provided with a plate portion 16b integrally joined to plate portion 16a which plate portion 16b is aligned so as to be arranged in substantially spaced parallel fashion relative to plate portion 15d of the infeed hopper support plate 15. Plate portion 16b is provided with suitable openings sufficient to permit a portion of the peripheries of idler roller 65 to protrude therethrough, in a manner shown best in FIG. 1, so as to make surface engagement with the periphery of acceleration wheels 60. The rearward end of portion 16b cooperates with member 15 to define a narrow outfeed "throat" to limit the number of sheets which may be advanced to drive wheels 23–23c. The centers of rotation of acceleration wheels 60 are spaced a distance G from the center of rotation of drive wheels 23, which distance G is preferably less than the width of the smallest sheet which can be accommodated by the feed and separating mechanism to cause the acceleration and idler wheels to grip the sheet before its trailing edge leaves the drive wheels. However, the spacing may be greater, if desired, since the drive wheels impart sufficient movement to sheets passing the drive wheels to assure proper advancement to the acceleration wheels. The tangential velocity of the peripheries of acceleration wheels 60 is significantly greater than the tangential velocity of the peripheries of drive wheels 23–23c to cause the single sheet fed thereto to move at a greater linear speed as the leading edge of the single sheet enters between acceleration wheels 60 and their cooperating idler rollers 65. This absolutely assures the fact that the trailing edge of the sheet passing between rollers 60 and 65 will clearly be separated by a finite gap from the leading edge of the next sheet in the stack which is delivered to rollers 60–65 by the drive wheels 23–23c.

STACKER

Each single sheet is fed into the region between plate 16c and plate 81 of a movable member 80 forming part of the stacker assembly 80 (see FIGS. 1 and 1a). Each single sheet is kicked against the base plate 83 of the stacker by means of stacker wheels 84–84c which are mounted upon a common shaft 85 journalled within bearings 86 and 87 so as to be free-wheeling relative to machine frame F. Shaft 85 is driven by a pulley member 89 which is coupled to a suitable pulley belt (not shown for purposes of simplicity) so as to rotate the stacker wheels in a direction shown by arrow 91 (see FIG. 1) to cause the leading edges of the sheets being fed thereto by acceleration wheels 60–60c to be "kicked" against base plate 83. A plurality of elongated strips 83b are arranged on the top surface of base plate 83 and are arranged in spaced parallel fashion as shown best in FIG. 1a. The top surfaces are polished to provide a smooth finish. The strips 83b reduce the amount of surface area of sliding engagement with the leading edges of the sheets stacked within the stacker. Wheels 84 preferably have peripheries exhibiting a coefficient of friction similar to that of wheels 23–23c, for example. Stacker member 112 is biased by a spring and pulley mechanism 95 and 96, respectively, which normally biases the stacker movable member 112 in the direction shown by arrow 97. As the sheets are deposited within the stacker, movable member 112 moves in the direction shown by arrow 98 against the force of spring 95 to form a neat and somewhat compressed stack of sheets within the stacker. Hooked end 95a of the spring is secured to a rod R, forming a part of the machine supporting frame, by fastening member 103. Hooked end 95b of the spring is fitted through an eyelet 104 secured to bracket 105 which rotatably supports pulley 106. A second pulley 107 is rotatably mounted upon bracket 108 which is fixedly secured to the left-hand end of base plate 83 by an L-shaped bracket 109. A thin tape member 110 has a first end secured between the yoke of bracket 108 and arm 109, as shown at 109a, is entrained about pulleys 106 and 107 and has its opposite end secured between the downward projection 112a of member 112 (which rides in slot 83a) and plate 111 which is secured to projection 112a by fasteners 111a. Bracket 111 is secured to the underside of member 112 enabling member 112 to move within an elongated guide slot 83a provided within base plate 83, while preventing member 112 from being lifted out of slot 83a. The use of a block and pulley arrangement yields a mechanical advantage in that pulley 106 moves only half the distance moved by member 112 to permit the use of a shorter spring (95) of greater spring tension.

Plate 16 has a final plate portion 16e integrally joined with plate portion 16c so as to alter the path of movement of the sheets from the direction shown by arrow 75 to the direction shown by arrow 76. Each sheet, in addition to being kicked against stacker base plate 83, is further abruptly urged against the confronting surface of plate 81, so that its trailing edge (see trailing edge T of sheet S''' in FIG. 1) is moved a substantial distance away from plate portion 16c of plate 16 so as to provide clearance for the next sheet to be fed to the stacker assembly.

The high-speed movement of sheets through apparatus 10 frequently causes the sheets to pick up some static electric charge, and thereby causing the sheets to be attracted to surface 16c. The action of kicker wheels 84 serves to overcome this attraction in driving the sheets against plate 81. In addition, the kicker wheels urge the leading edges of the sheets against base plate 83 to stack the sheets in a neat fashion. The force of spring 95 normally urges member 112 in the direction of arrow 97 to compress the formed stack. If desired, the plate 81 may be removed, whereby only upwardly projecting member 112 is employed in the stacker to support sheets within the stacker. The ends of the sheets extending laterally of the member 112 experience no restraining force and thereby form a "butterfly" pattern. However, the stacking operation is performed as effectively as would be the case if plate 81 were provided. The removal of plate 81 facilitates removal of all sheets in the stack, whereas plate 81 obscures the stack and the possibility that one or more sheets may not have been removed from the stacker may go undetected.

It can be seen from the foregoing description that the present invention provides a novel stacking mechanism capable of feeding and stacking single sheets from a large stack of sheets which may contain sheets of dissimilar sizes, thicknesses and finishes and, in fact, may even be slightly or partially mutilated without any effect whatsoever upon the separation operation. The primary distinctions between the feeding and stacking device described herein over conventional apparatus are:

a. no adjustment is required for any of the machine components to individually feed and stack sheets of differing sizes, thicknesses, weights or finishes of paper, plastic or other flat material; also, the sheets may be fed in stacks containing sheets of either uniform or differing characteristics or sizes with equal success;

b. the intermixed stock may vary in thickness, over a wide range. For example, those embodiments already developed are capable of handling sheets of thicknesses at least within the range from 0.002 to 0.021 inch and are capable, for example, of accommodating sheets which may vary in width in the range from at least 2.5 to 7 inches and in the range from at least 2.5 to 24 inches in the direction of travel;

c. non-uniform and non-square-edged stock may be fed and stacked with equal success; and d. the design of the apparatus is such that there is no mutilation, bending or curling of the sheets during any phase of the feeding, separating and stacking operations and the apparatus is virtually "jam-free" throughout the entire operation.

The embodiments of the invention in which an exclusive privilege is claimed are defined as follows:

1. Apparatus for receiving and neatly stacking a plurality of sheets of varying size, thickness, condition, shape and finish moving in a first predetermined direction toward said apparatus in tandem fashion comprising:

deflecting means positioned in the path of movement of said sheets for deflecting said sheets away from said first direction and toward said stacking apparatus and for simultaneously realigning sheets moving toward said deflection means in a skewed fashion;

stacking means comprising a guiding plate for engaging the leading edges of sheets delivered to said stacking means, said guiding plate having track means;

a bar having a base slidably engaged by said track means for moving along said path defined by said track means;

said bar having a surface for engaging the surface of a sheet delivered to said stacking means;

said surface being inclined at an angle of less than 90° relative to the surface of said guiding plate;

the end of said deflecting means closest to said bar being inclined at another angle of less than 90° relative to both said surface and said guiding plate, said deflecting means end having an opening;

kicker means including at least one cylindrical roller having a continuous smooth surface and means for rotating said roller about an axis thereof with at least a portion of said continuous roller surface partially protruding through said opening for slidingly engaging the leading edge of each sheet delivered to said kicker means and cooperating with said deflection means end for redeflecting said engaged sheet leading edge both towards said first direction and against said guiding plate and for urging said trailing edge of each sheet delivered to said kicker means toward said bar inclined surface to permit the edge of the next sheet delivered to the stacking means to move between said last sheet and said kicker means unimpeded by said last sheet;

biasing spring means;

linkage means having a mechanical advantage greater than one for interconnecting said biasing spring means to said bar, whereby the elongation of said spring means is inversely proportional to the distance moved by said bar in response to the accumulation of said sheets thereon to render more uniform the force exerted on said bar by said spring means.

2. The apparatus of claim 1 wherein the periphery of said roller is formed of a material having a coefficient of friction sufficient to cause the leading edge of a sheet delivered to said stacking means to urge said bar away from said kicker means and to strike said guiding plate.

3. The apparatus of claim 1 further comprising a flat plate fixedly secured to the inclined surface of said bar to present a surface for supporting sheets in said stack which surface extends outwardly from both ends of said inclined surface.

* * * * *